United States Patent
Ingram et al.

(10) Patent No.: US 9,664,385 B2
(45) Date of Patent: May 30, 2017

(54) PROCESS FOR ENABLING CARBON-CAPTURE FROM EXISTING COMBUSTION PROCESSES

(71) Applicant: PHILLIPS 66 COMPANY, Houston, TX (US)

(72) Inventors: David B. Ingram, Bartlesville, OK (US); Uchenna P. Paul, Bartlesville, OK (US)

(73) Assignee: Phillips 66 Company, Houston, TX (US)

(*) Notice: Subject to any disclaimer, the term of this patent is extended or adjusted under 35 U.S.C. 154(b) by 481 days.

(21) Appl. No.: 14/021,573

(22) Filed: Sep. 9, 2013

(65) Prior Publication Data
US 2014/0076213 A1 Mar. 20, 2014

Related U.S. Application Data

(60) Provisional application No. 61/701,792, filed on Sep. 17, 2012.

(51) Int. Cl.
*F23L 7/00* (2006.01)
*B01D 53/76* (2006.01)
(Continued)

(52) U.S. Cl.
CPC .............. *F23L 7/007* (2013.01); *B01D 53/76* (2013.01); *C01B 3/38* (2013.01); *C01B 3/384* (2013.01); *C25B 1/00* (2013.01); *C25B 1/04* (2013.01); *C25B 15/08* (2013.01); *F23C 9/00* (2013.01); *F23L 7/005* (2013.01); *B01D 53/047* (2013.01); *B01D 2256/16* (2013.01); *B01D 2257/504* (2013.01); *C01B 2203/0233* (2013.01); *C01B 2203/0283* (2013.01); *C01B 2203/043* (2013.01); *C01B 2203/1241* (2013.01); *F23J 2215/40* (2013.01); *F23J 2215/50* (2013.01); *Y02E 20/322* (2013.01); *Y02E 20/344* (2013.01); *Y02E 60/366* (2013.01); *Y02P 20/152* (2015.11)

(58) Field of Classification Search
CPC .............. B01D 53/76; F23L 7/00; F23C 9/00
USPC .................. 431/5, 11; 423/210; 110/345
See application file for complete search history.

(56) References Cited

U.S. PATENT DOCUMENTS

4,728,584 A 3/1988 Isenberg
9,187,835 B2 * 11/2015 Albrecht .................. C25B 1/00
(Continued)

FOREIGN PATENT DOCUMENTS

WO 2011022653 2/2011

OTHER PUBLICATIONS

PCT Notification of Transmittal of the International Search Report and the Written Opinion of the International Searching Authority, or the Declaration, International Application No. PCT/US2013/58857, International Filing Date Sep. 10, 2013, 12 Pages.
(Continued)

*Primary Examiner* — Gregory Huson
*Assistant Examiner* — Nikhil Mashruwala
(74) *Attorney, Agent, or Firm* — Phillips 66 Company

(57) ABSTRACT

A process of producing a feed from a solid oxide electrolysis cell. A first portion of the flue gas produced from a combustion process is directed to the anode side of the solid oxide electrolysis cell. The feed and a second portion of the flue gas are then mixed to produce an enhanced feed. The enhanced feed is then mixed with fuel and combusted in the combustion process to produce flue gas. The flue gas comprises greater than 50 wt % $CO_2$ and less than 1 wt % $N_2$.

18 Claims, 5 Drawing Sheets

(51) Int. Cl.
*F23C 9/00* (2006.01)
*C01B 3/38* (2006.01)
*C25B 1/04* (2006.01)
*C25B 15/08* (2006.01)
*C25B 1/00* (2006.01)
*B01D 53/047* (2006.01)

(56) References Cited

U.S. PATENT DOCUMENTS

| | | | | |
|---|---|---|---|---|
| 2003/0138747 A1* | 7/2003 | Zeng | ................ | B01D 53/04 |
| | | | | 431/2 |
| 2007/0217995 A1* | 9/2007 | Matsumura | ............... | C25B 1/04 |
| | | | | 423/657 |
| 2008/0250715 A1* | 10/2008 | Cooper | ................ | B01D 47/06 |
| | | | | 48/197 FM |
| 2012/0171588 A1 | 7/2012 | Fan et al. | | |
| 2014/0272734 A1* | 9/2014 | Braun | ................ | C25B 1/02 |
| | | | | 431/11 |

OTHER PUBLICATIONS

B.J.P. Buhre, L.K. Elliott, C.D. Sheng, R.P. Gupta, T.F. Wall, "Oxy-Fuel Combustion Technology for Coal-Fired Power Generation", Science Direct. Process in Energy and Combustion Science 31, 2005, pp. 283-307.

* cited by examiner

PROCESS FOR ENABLING CARBON-CAPTURE FROM EXISTING COMBUSTION PROCESSES

CROSS-REFERENCE TO RELATED APPLICATIONS

This application is a non-provisional application which claims the benefit of and priority to U.S. Provisional Application Ser. No. 61/701,792 filed Sep. 17, 2012, entitled "Process for Enabling Carbon-Capture from Existing Combustion Processes," which is hereby incorporated by reference in its entirety.

STATEMENT REGARDING FEDERALLY SPONSORED RESEARCH OR DEVELOPMENT

None.

FIELD OF THE INVENTION

This invention relates to a process for enabling carbon-capture from existing combustion processes.

BACKGROUND OF THE INVENTION

Conventional combustion processes have associated $CO_2$ emissions that have been identified as an area for potential reduction of greenhouse gas emissions within refineries.

Technologies such as amine scrubbing can remove $CO_2$ from process gas streams, such as the flue gas waste stream from combustion processes such as a steam methane reformer (SMR) furnace or a fluidized catalytic cracker (FCC) regenerator. Combustion processes typically involve combustion of a fuel (for example natural as for an SMR furnace or coke for an FCC regenerator) using air as the oxidant. Because the fuel is burned in the presence of air, the exiting flue gas comprises mostly nitrogen. While the concentration of $CO_2$ in the flue gas is relatively low, the flow rate is large, such that a majority of a refinery's total $CO_2$ emissions are emitted during combustion processes. Some of the remaining $CO_2$ comes from reaction processes where it is produced in a stream with a relatively high $CO_2$ partial pressure (typically around 45 psia), such that the $CO_2$ can be effectively captured using amine scrubbing technology. On the other hand, combustion flue gas streams are mostly nitrogen, thus it is cost prohibitive to size an amine scrubber to process the entire streams. The result is an upper limit to how much $CO_2$ could be captured practically in a refinery. This could have a significant impact on the economics of individual combustion processes or an entire refinery if $CO_2$ emission taxes, incentives, and/or caps were imposed.

One way that others have proposed to solve this problem is by using an oxygen-fuel combustion process instead of conventional combustion processes. In oxygen-fuel combustion process, the fuel is combusted in an oxygenated environment rather than air. The resulting flue gas primarily consists of $CO_2$ and $H_2O$ with very little nitrogen. The $H_2O$ in the fine gas is easily removed through condensation, leaving, a stream of concentrated $CO_2$ that is ready for compression, transportation and sequestration. This process greatly increases the amount of $CO_2$ that could be captured practically from a combustion process.

One of the largest obstacles in operating an oxygen-fuel combustion process is obtaining oxygen. Typically, the only proposed method of obtaining oxygen to a combustion process is the use of an air separation unit. The problems with air separation units is that they typically separate oxygen and nitrogen from air through a cryogenic separation process, which has large capital, operating costs and $CO_2$ footprint associated. An example of technology that is able to provide large quantities of oxygen to SMR boiler furnace is U.S. Provisional 61/673,021, hereby incorporated by reference.

There exists a need to produce and deliver oxygen in high quantities and purity in a safe and cost effective manner to operate with oxygen-fuel combustion processes.

BRIEF SUMMARY OF THE DISCLOSURE

A process of producing a feed from a solid oxide electrolysis cell. A first portion of the flue as produced from a combustion process is directed to the anode side of the solid oxide electrolysis cell to produce a feed containing oxygen and CO2. The feed and a second portion of the flue gas are then mixed to produce an enhanced feed. The enhanced feed is then mixed with fuel and combusted in the combustion process to produce flue gas. The flue gas comprises greater than 50 wt % $CO_2$ and less than 1 wt % $N_2$.

In yet another embodiment a process is taught of directing a first portion of the flue gas, at least 50 wt %, produced from a combustion process to the anode side of a solid oxide electrolysis cell. A feed is produced from the solid oxide electrolysis cell containing oxygen and CO2. Feed and a second portion of the flue gas are mixed to produce an enhanced feed. The enhanced feed is mixed with fuel and combusted in a combustion process to produce flue gas. The flue gas comprises greater than 75 wt % $CO_2$ and less than 1 wt % $N_2$.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

The following examples of certain embodiments of the invention are given. Each example is provided by way of explanation of the invention, one of many embodiments of the invention, and the following examples should not be read to limit, or define, the scope of the invention.

Any conventionally used and/or known combustion process can be used. Two known combustion processes are steam methane reformer (SMR) furnaces or fluidized catalytic cracker (FCC) regenerators.

One example where a combustion process is used is a SMR process. Generally, SMR processes can be described by two main reactions:

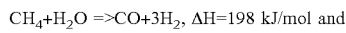

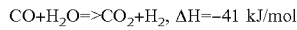

The first reaction is reforming, while the second is a water-gas shift reaction. Since the overall reaction is endothermic, some heat input is required. Typically, this was accomplished by the combustion of natural gas or other fuels in a direct fired furnace.

Figure 1:
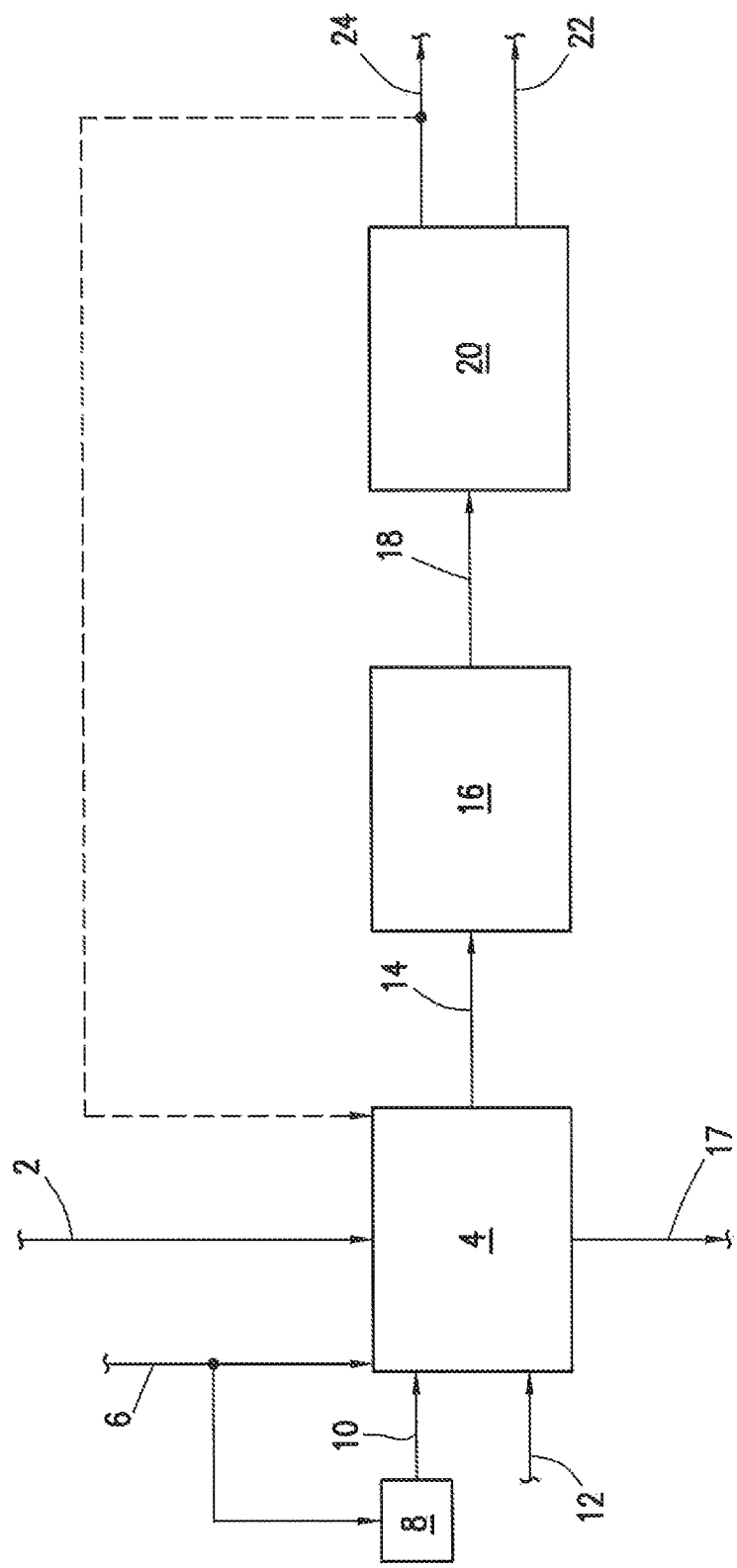
FIG. 1 depicts a conventional SMR system.

FIG. 1 depicts a representative SMR furnace wherein a pre-heated mixture of natural gas and steam is passed through catalyst-filled tubes. Also in this figure air 2 flows into a steam reformer 4 and is used to combust part of the natural gas feed outside of the reformer tubes. Additionally, while natural gas is a typical hydrocarbon that can be fed into the steam reformer, it is known and envisioned that other light hydrocarbons, such as methane, naphtha, butane, liquid petroleum gas, fuel gas, natural gas liquids, pressure swing absorber off-gas, biogas, or refinery feedstock, can be utilized as a carbon feedstock for the steam reformer.

In some designs the natural gas 6 undergoes contaminants removal to remove contaminants such as sulfur prior to being fed into the steam reformer 4. In FIG. 1, the contaminate removal 8 can remove contaminates to produce a purified natural gas 10. Additionally, steam 12, in this figure, was also fed into the steam reformer 4.

The steam reformer 4 produces both effluent gas 14 and flue gas 17. Optionally, the effluent gas 14 can be further reacted in reactor 16 to produce more hydrogen and carbon dioxide. The reaction that takes place in reactor 16 is typically a water-gas shift reaction to produce shifted effluent gas 18.

The shifted effluent gas 18 then undergoes pressure swing adsorption 20 wherein $H_2$ 22, is separated from the other product gases 24 consisting primarily $CO_2$, high BTU fuel gases, and other gases inducting nitrogen, argon or other chemicals and gases present in the original reaction from the steam reformer 4. A slipstream of these other gases 24 can flow back into the SMR furnace 4.

As shown in Table 1 the $CO_2$ content of the gas stream is typically less than 50%.

| Gas Stream | Typical $CO_2$ content |
| --- | --- |
| Effluent gas after SMR | 5-10% |
| Shifted effluent gas after Water Gas Shift | 10-20% |
| Shifted effluent gas after Pressure Swing Adsorption | 40-50% |

Under this design the flue gas 17 would have a high amount of nitrogen. This is due to air 2 typically containing around 78% nitrogen.

A second example where a combustion process is used is a FCC process wherein the FCC catalyst is regenerated by combusting the coke formed on the catalyst in a unit referred to as the FCC regenerator.

In the FCC process, catalyst circulates between a cracking reactor and a catalyst regenerator. In the reactor, hydrocarbon feed contacts a source of hot, regenerated catalyst. The hot catalyst vaporizes and cracks the feed at 425° C.-600° C. The cracking reaction deposits carbonaceous hydrocarbons or coke on the catalyst, thereby deactivating the catalyst. The cracked products are separated from the coked catalyst. The coked catalyst is stripped of volatiles, usually with steam, in a catalyst stripper and the stripped catalyst is then regenerated. The catalyst regenerator burns coke from the catalyst with oxygen containing gas, usually air. Decoking restores catalyst activity and simultaneously heats the catalyst to, e.g., 500° C.-900° C. This heated catalyst is recycled to the cracking reactor to crack more fresh feed. Flue gas formed by burning coke in the regenerator may be treated for removal of particulates and for conversion of carbon monoxide, after which the flue gas is normally discharged into the atmosphere.

In one embodiment the combustion process (steam methane reforming furnace, FCC regenerator, or other process) is an oxygen-fuel combustion process.

The present embodiment describes a process for using a solid oxide electrolysis cell to produce a feed that is used as the oxidant stream for a combustion process.

In one embodiment a solid oxide electrolysis cell is used to produce a feed containing greater than 99 wt % oxygen. The feed is then optionally mixed with a portion of the flue gas from a combustion process to produce an enhanced feed containing oxygen and $CO_2$. The enhanced feed would then be directed into the combustion process. In different embodiments the ratio of the flue gas and the feed can be modified to create the enhanced feed. In one embodiment the enhanced feed contains 100 wt % feed. In other embodiments the enhanced feed can contain at least 95 wt %, 90 wt %, 85 wt %, 80 wt %, 75 wt %, 70 wt %, 65 wt %, 60 wt %, 55 wt %, 50 wt %, 45 wt %, 40 wt %, 35 wt %, 30 wt %, 25 wt %, 20 wt %, 15 wt %, 10 wt %, 5 wt %, and even 1 wt %, feed. In another embodiment the enhanced feed contains 100 wt % flue gas. In other embodiments the enhanced feed can contain at least 95 wt %, 90 wt %, 85 wt %, 80 wt %, 75 wt %, 70 wt %, 65 wt %, 60 wt %, 55 wt %, 50 wt %, 45 wt %, 40 wt %, 35 wt %, 30 wt %, 25 wt %, 20 wt %, 15 wt %, 10 wt %, 5 wt %, and even 1 wt %, flue gas.

In another embodiment a portion of a flue gas stream from a combustion process is directed to the inlet of a solid oxide electrolysis cell anode. The solid oxide electrolysis cell anode then produces a feed containing oxygen and $CO_2$. In different embodiments the ratio of oxygen and $CO_2$ in the feed can be modified. In one embodiment the feed contains greater than 99 wt % oxygen. In other embodiments the feed can contain at least 95 wt %, 90 wt %, 85 wt %, 80 wt %, 75 wt %, 70 wt %, 65 wt %, 60 wt %, 55 wt %, 50 wt %, 45 wt %, 40 wt %, 35 wt %, 30 wt %, 25 wt %, 20 wt %, 15 wt %, 10 wt %, 5 wt %, and even at least 1 wt % oxygen. The feed produced from the solid oxide electrolysis cell anode is then optionally mixed with a second portion of the flue gas from a combustion process to produce an enhanced feed containing a lower concentration of oxygen than the feed. The enhanced feed would then be directed into the combustion process. In different embodiments the ratio of oxygen and $CO_2$ in the enhanced feed can be modified. In one embodiment the enhanced feed contains greater than 99 wt % oxygen. In other embodiments the feed can contain at least 95 wt %, 90 wt %, 85 wt %, 80 wt %, 75 wt %, 70 wt %, 65 wt %, 60 wt %, 55 wt %, 50 wt %, 45 wt %, 40 wt %, 35 wt %, 30 wt %, 25 wt %, 20 wt %, 15 wt %, 10 wt %, 5 wt %, and even 1 wt % oxygen.

Figure 2:
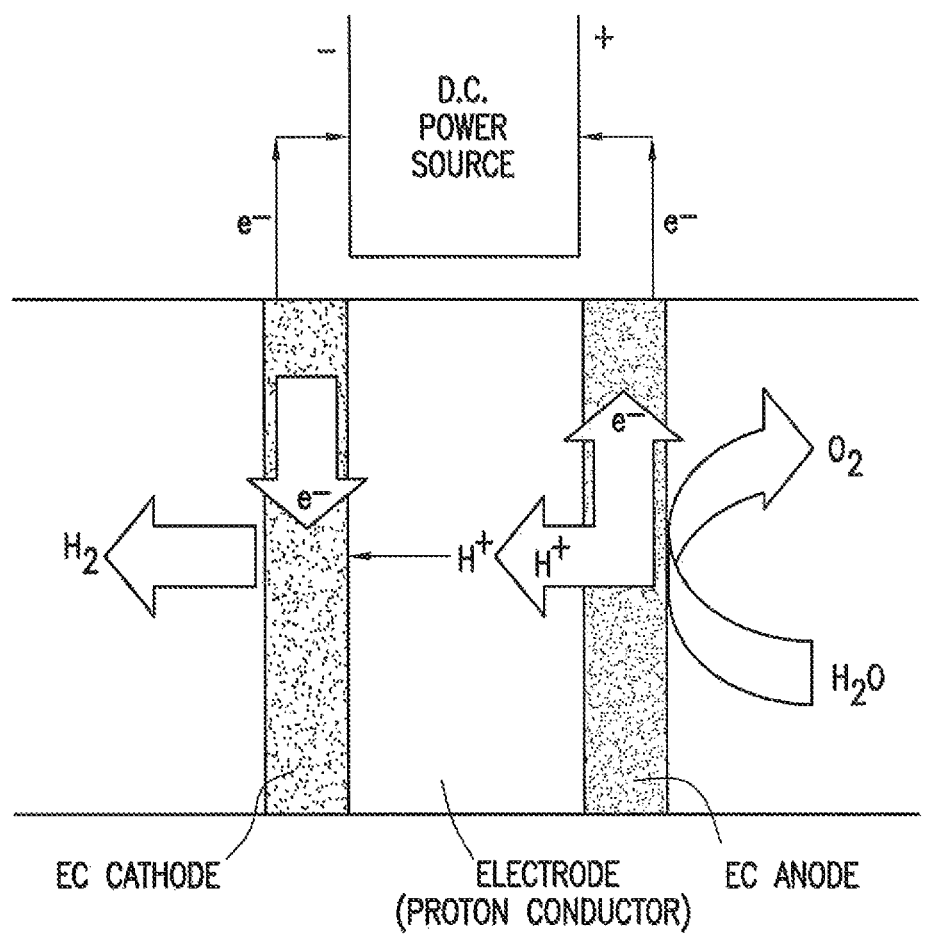
FIG. 2 depicts a schematic diagram of a solid oxide electrolysis cell.

Any conventionally known or used solid oxide electrolysis cell can be used. As an example a schematic diagram of a solid oxide electrolysis cell is shown in FIG. 2.

Typically in a solid oxide electrolysis cell, water is supplied to the cathode side of the solid oxide electrolysis cell. The cathode electrocatalyst then uses electrons to split $H_2O$ molecules to produce hydrogen gas oxygen anions ($O^{2-}$). The oxygen anions are then transported through the electrolyte to the anode where they are oxidized to produce oxygen gas.

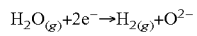

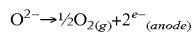

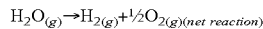

Each oxygen molecule that is effectively transported from cathode to anode requires that two electrons flow through the external circuit; therefore, the desired $O_2$ production rate dictates the necessary electrical current flowing through the cell. The efficiency of the solid oxide electrolysis cell materials (anode, electrolyte and cathode) at performing the reactions above dictates the achievable current density (current divided by electrode area). It is theorized that a higher current density should result in a decreased capital cost for operating the solid oxide electrolysis cell.

The power required to operate the solid oxide electrolysis cell unit would be a product of the current and the necessary applied voltage. Thus, if the solid oxide electrolysis cell can be operated at a low voltage for a given current, then the power consumed to produce purified $H_2$ and $O_2$ will be relatively low. The Nernst equation can be used to estimate the minimum required voltage at different pressures or temperatures.

The operation of a solid oxide electrolysis cell (SOEC) differs from a solid electrolyte oxygen separator (SEOS) in several significant ways. While both devices can produce purified oxygen, a SOEC also uses $H_2O$ and/or $CO_2$ to produce $H_2$ and/or CO gas, which are high value by-products. The ability of a SOEC to consume $CO_2$ makes it theoretically possible to operate the device with a negative $CO_2$ emissions footprint, which is not the case for a SEOS. In addition, the optimal materials of construction, especially for the cathode electrocatalyst, are significantly different in the two devices.

In one embodiment the production of the oxygen in the solid oxide electrolysis cell occurs in ambient pressure.

The present process has the solid oxide electrolysis cell upstream of the combustion process, a portion of the combustion flue gas optionally directed to the anode side of the solid oxide electrolysis cell, and a second portion of the combustion flue gas optionally mixed with the feed produced by the solid oxide electrolysis cell.

Figure 3:
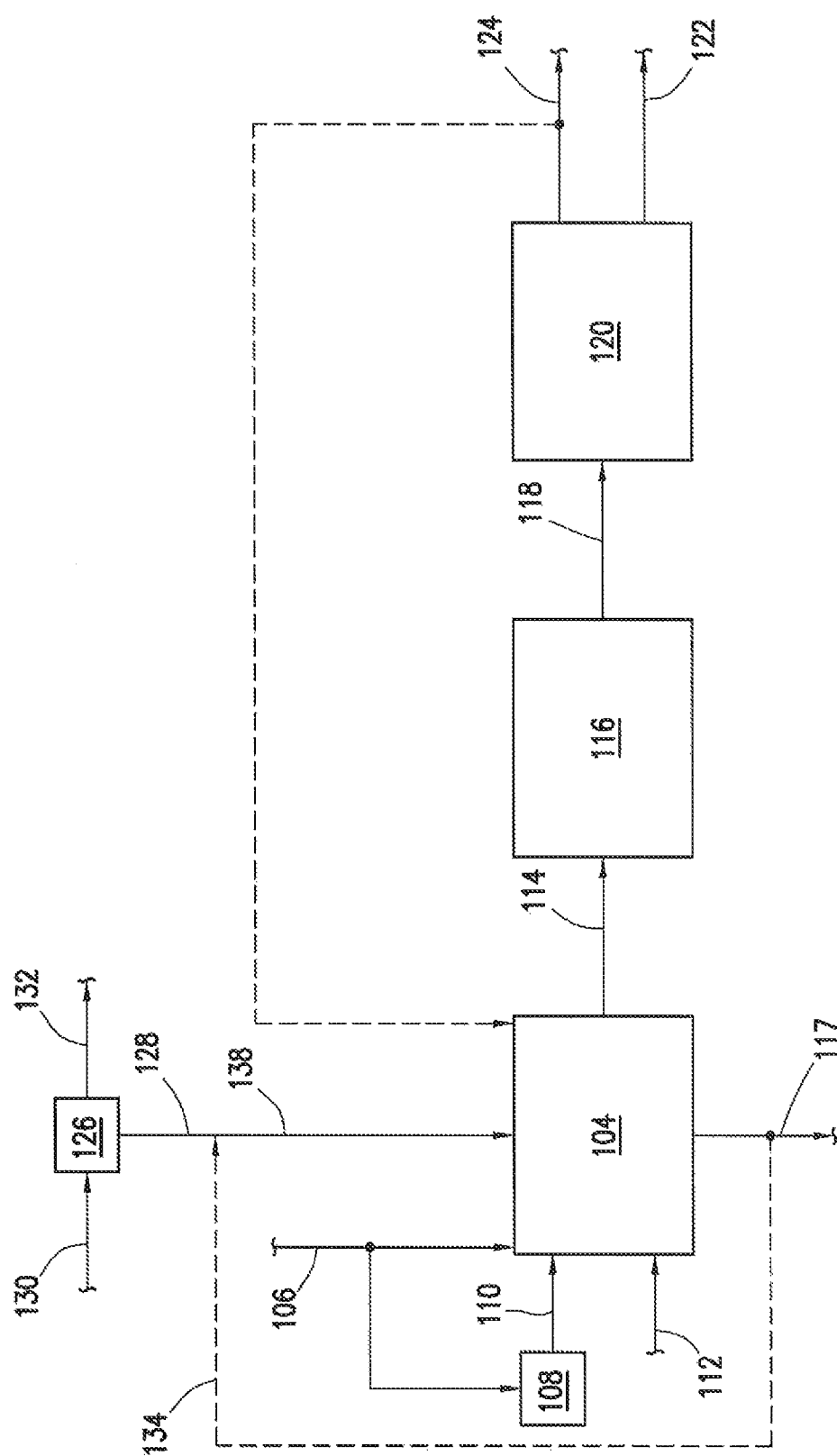
FIG. 3 depicts an embodiment of the novel process.

FIG. 3 depicts one embodiment of this process wherein the SMR furnace is used as an example of the combustion process.

$H_2O$ and/or $CO_2$ 130 is directed to a solid oxide electrolysis cell 126 to produce $H_2$ and/or CO 132 from the cathode and a feed 128 containing oxygen from the anode. In one embodiment the feed 128 contains 95 wt %, 99 wt %, and even 100 wt % oxygen.

In this figure it is shown that a slipstream 134 of the flue gas 117 can optionally be mixed with the reed stream 128 to produce an enhanced feed 138. The slipstream 134 amount from the flue gas 117 can be 20 wt %, 30 wt %, 40 wt %, 50 wt %, 50 wt %, 60 wt %, 70 wt %, 80 wt % 90 wt %, 99 wt % even 100 wt %. The resulting enhanced feed stream 138 contains oxygen and $CO_2$. The oxygen content in the enhanced feed stream 138 can be 10 wt %, 20 wt %, 30 wt %, 40 wt %, 50 wt %, 50 wt %, 60 wt %, 70 wt %, 80 wt % 90 wt %, 99 wt % even 100 wt %.

The outputs for the SMR furnace 104 are effluent 114 and flue gas 117. Dependent upon the oxygen concentrations of the inputs into the SMR furnace 104 the flue gas 117 can contain less than 50 wt %, 25 wt %, 10 wt %, 5 wt %, 1 wt %, even no nitrogen. Due to these low amounts of nitrogen emitted from the SMR furnace in one embodiment the flue gas would not have to undergo any subsequent nitrogen separation step.

The fuel 106 for this SMR furnace can be any conventional light hydrocarbons, such as methane, biogas or refinery feedstock. As shown in FIG. 3, the contaminate retrieval 108 can also remove contaminates to produce a purified fuel 110.

In one embodiment steam 112, can also be an input into the SMR furnace.

The effluent 114 can then go undergo a conventional water-gas shift reaction 116 to produce shifted effluent 118. This shifted effluent 118 can then undergo $H_2$ purification (for example, with a pressure swing adsorption 120) to separate $H_2$ 122. from the product gases 124 consisting primarily $CO_2$, high BTU fuel gases, and other gases including nitrogen, argon or other chemicals and gases present in the original reaction in the steam reformer 104. A slipstream of these other gases can flow back into the SMR furnace 104.

These other gases 124 could be recycled into the reformer 104 to be combusted with the oxidant feed from the solid oxide electrolysis cell. Consequently, all the $CO_2$ from reformer is now concentrated in stream 117. It is theorized that this stream 117 will contain at least 50 wt %, 70 wt %, 80 wt %, 90 wt % even close to 100 wt % $CO_2$ with the remainder being mostly water.

When a slipstream 134 of stream 117 is taken and mixed with the feed 128 to produce an enhanced feed 138 it is theorized that the enhanced feed 138 will contain mostly $CO_2$ and $O_2$. Since the solid oxide electrolysis cell produces a feed 128 near 100% oxygen and the stream 117 is mostly $CO_2$ it will continue to produce a stream 117 essentially free of nitrogen.

By adding the slipstream 134 to feed 128, the oxygen in enhanced feed 138 is diluted by $CO_2$ in slipstream 134. By not having pure oxygen being fed into the SMR furnace it is theorized that the process will be safer. In one embodiment it is possible that the enhanced feed can contain only $CO_2$ and $O_2$. In other embodiments it is possible that the enhanced feed can contain 20% $CO_2$/80% $O_2$, 25% $CO_2$/75% $O_2$, 30% $CO_2$/70% $O_2$, 40% $CO_2$/60% $O_2$, 50% $CO_2$/50% $O_2$, 60% $CO_2$/40% $O_2$, even 75% $CO_2$/25% $O_2$.

Figure 4:
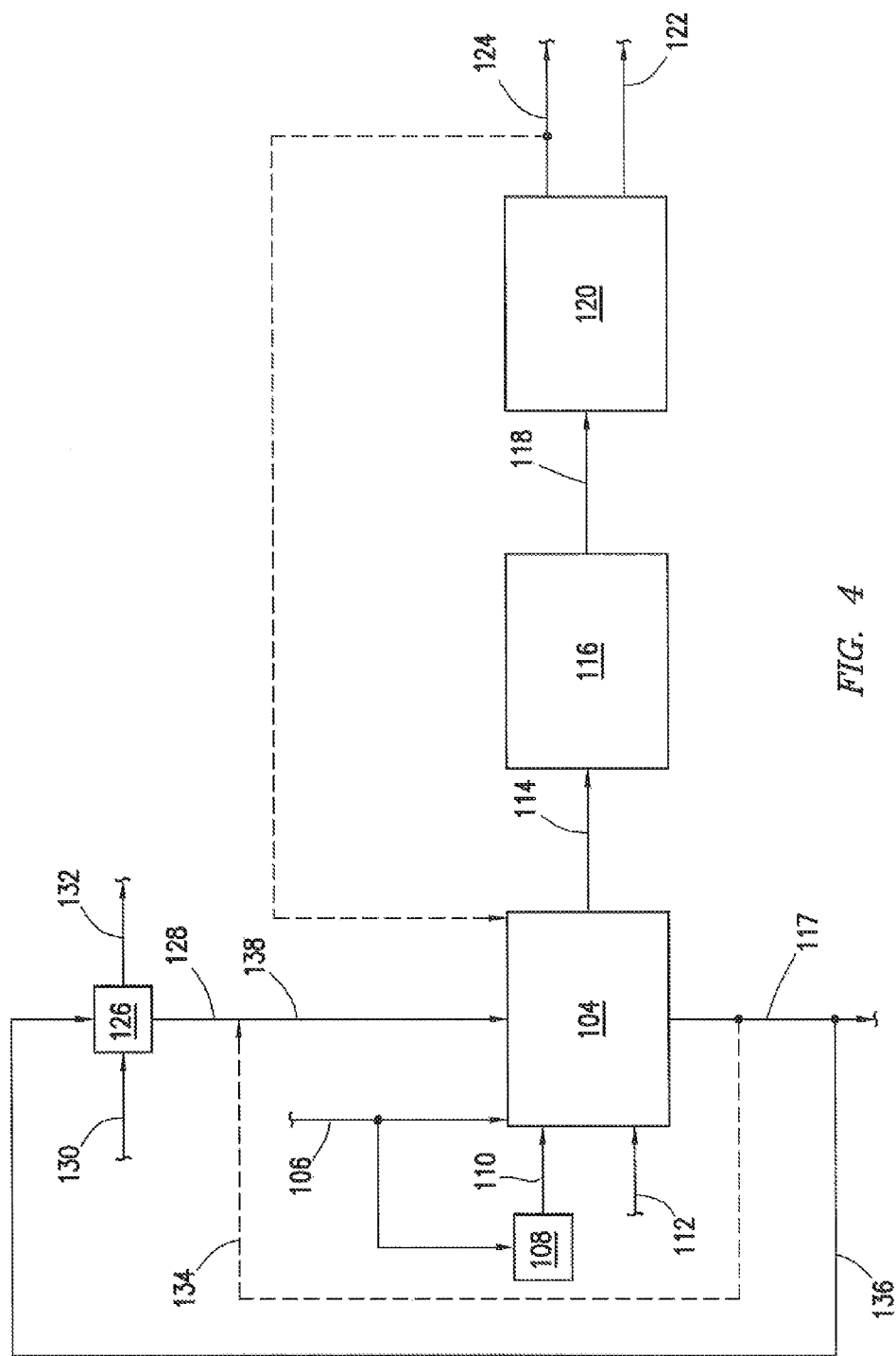
FIG. 4 depicts an embodiment of the novel process.

FIG. 4 depicts another embodiment as a variation of FIG. 3 wherein a Slipstream 136 of the flue gas stream 117 is directed to the inlet of the anode compartment of the solid oxide electrolysis cell 126. The resulting feed 128 produced then contains oxygen and $CO_2$, rather than being near 100% oxygen. A second slipstream 134 of the flue gas stream 117 can also be mixed with the feed 128 to produce an enhanced feed 138 with lower oxygen concentration than feed 128.

Figure 5:
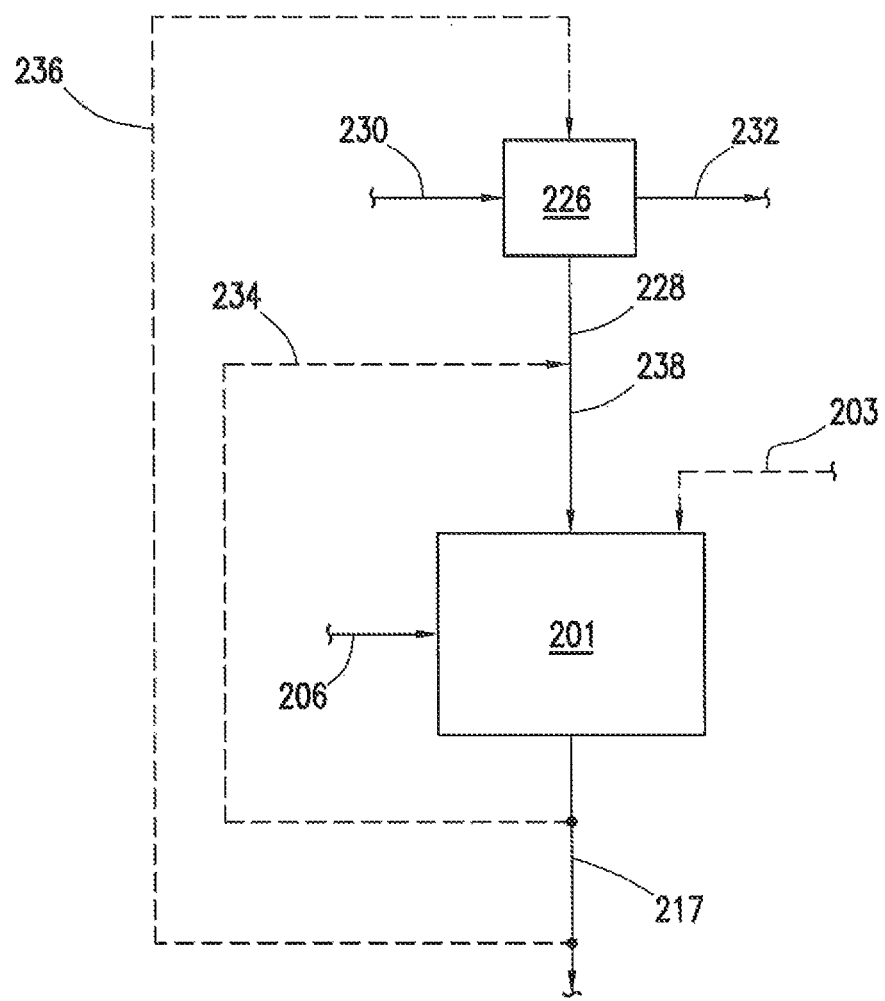
FIG. 5 depicts an embodiment of the novel process.

FIG. 5 presents another embodiment wherein a generic combustion process 201 is depicted, rather than a specific example. $H_2O$ and/or $CO_2$ 230 are directed to a solid oxide electrolysis cell 226 to produce $H_2$ and/or CO 232 from the cathode and a feed containing oxygen 228 from the anode. In one embodiment the feed 228 contains at least 95 wt %, 99 wt %, and even 100 wt % oxygen. In one embodiment a slipstream of the combustion process flue gas 236 is directed to the inlet of the solid oxide electrolysis cell anode such that the feed 228 produced contains oxygen and $CO_2$. In one embodiment a second slipstream 234 can be mixed with the feed 228 to produce an enhanced feed 238. In the combustion process 201, fuel 206 and enhanced feed 238 are mixed and combusted to produce a flue gas stream 217. Because the solid oxide electrolysis cell produces a feed containing oxygen and $CO_2$, it is theorized that the resulting combustion flue gas stream 217 should contain little or no nitrogen. FIG. 5 also indicates that enhanced feed stream 238 may not be the only source of oxygen for the combustion process 201. In this embodiment FIG. 5 depicts how an optional inlet can be used to flow air 203 into the combustion process 201, in this embodiment flow regulators can be used to vary the amounts of air 203 and enhanced feed 238 that are added to the combustion process 201. The amount of air 203 compared to the enhanced feed 238 added can vary up to 1 wt %, 5 wt %, 10 wt %, 25 wt %, 50 wt %, 90 wt % even 99 wt % air.

Optionally, in all the embodiments, flow regulators can be used along each of the individual pipelines to vary the amounts of fuel, feed, enhanced feed, feed-fuel mixtures, steam, air and any other inlet pipes into the combustion process. Additionally, any other conventionally known chemical, gas, solid, or liquid, can be added to the combustion process, in its own pipeline or jointly added with another pipeline, to enhance its operability by one skilled in the art In closing, it should be noted that the discussion of any reference is not an admission that it is prior art to the present invention, especially any reference that may have a publication date after the priority date of this application. At the same time, each and every claim below is hereby incorporated into this detailed description or specification as an additional embodiment of the present invention.

Although the systems and processes described herein have been described in detail, it should be understood that various changes, substitutions, and alterations can be made without departing from the spirit and scope of the invention as defined by the following claims. These skilled in the art may be able to study the preferred embodiments and identify other ways to practice the invention that are not exactly as described herein. It is the intern of the inventors that variations and equivalents of the invention are within the scope of the claims while the description, abstract and drawings are not to be used to limit the scope of the invention. The invention is specifically intended to be as broad as the claims below and their equivalents.

The invention claimed:

1. A process comprising:
   producing a feed from a solid oxide electrolysis cell;
   directing a first portion of the flue gas produced from a combustion process, to the anode side of the solid oxide electrolysis cell;
   mixing the feed and a second portion of the flue gas to produce an enhanced feed, wherein
   the second portion of the flue gas is at least 1 wt % of the enhanced feed; and
   combusting the enhanced feed in the combustion process to produce flue gas,
   wherein the flue gas comprises greater than 50 wt % $CO_2$ and less than 1 wt % $N_2$.

2. The process of claim 1, wherein the combustion process is either a steam methane reformer furnace or a fluidized catalytic cracker regenerator.

3. The process of claim 2, wherein the steam methane reforming furnace is an oxygen-fuel steam methane reforming furnace.

4. The process of claim 1, wherein the feed and the flue gas is mixed with natural gas prior to combustion by the combustion process.

5. The process of claim 1, wherein air is added to the combustion process.

6. The process of claim 5, wherein up to 99 wt % air compared to the enhanced feed is added to the combustion process.

7. The process of claim 5, wherein the enhanced feed is mixed with natural gas and air prior to combustion by the combustion process.

8. The process of claim 1, wherein the flue gas does not contain any nitrogen.

9. The process of claim 1, wherein the production of the feed occurs at ambient pressure.

10. The process of claim 1, wherein the flue gas does not undergo any subsequent nitrogen separation step.

11. The process of claim 1, wherein the feed produced from the solid oxide electrolysis cell contains greater than 95 wt % oxygen.

12. The process of claim 1, wherein the feed produced from the solid oxide electrolysis cell is 100 wt % oxygen.

13. The process of claim 1, wherein at least 25 wt % of the flue gas is directed to the anode side of the solid oxide electrolysis cell.

14. The process of claim 1, wherein at least 50 wt % of the flue gas is directed to the anode side of the solid oxide electrolysis cell.

15. The process of claim 1, wherein a portion of the flue gas is directed to the anode side of the solid oxide electrolysis cell and a portion is fed directly into the combustion process.

16. The process of claim 1, wherein a portion of the flue gas is directed to the anode side of the solid oxide electrolysis cell and a portion undergoes direct $CO_2$ capture.

17. The process of claim 1, wherein a portion of the flue gas is directed to the anode side of the solid oxide electrolysis cell, a portion is fed directly into the combustion process and a portion undergoes direct $CO_2$ capture.

18. A process comprising:
    directing a first portion of the flue gas, at least 50 wt %, produced from a combustion process, to the anode side of a solid oxide electrolysis cell;
    producing a feed from the solid oxide electrolysis cell; and
    mixing the feed and a second portion of the flue gas to produce an enhanced feed, wherein
    the second portion of the flue gas is at least 1 wt % of the enhanced feed;
    mixing the enhanced feed with a fuel; and
    combusting the enhanced feed and the fuel in the combustion process to produce flue gas wherein the flue gas comprises greater than 75 wt % $CO_2$ and less than 1 wt % $N_2$.

* * * * *